(12) United States Patent
Audhkhasi et al.

(10) Patent No.: US 11,256,982 B2
(45) Date of Patent: *Feb. 22, 2022

(54) NOISE-ENHANCED CONVOLUTIONAL NEURAL NETWORKS

(71) Applicant: UNIVERSITY OF SOUTHERN CALIFORNIA, Los Angeles, CA (US)

(72) Inventors: Kartik Audhkhasi, White Plains, NY (US); Bart Kosko, Hacienda Heights, CA (US); Osonde Osoba, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 14/803,797

(22) Filed: Jul. 20, 2015

(65) Prior Publication Data
US 2016/0019459 A1     Jan. 21, 2016

Related U.S. Application Data

(60) Provisional application No. 62/026,359, filed on Jul. 18, 2014.

(51) Int. Cl.
*G06N 3/08*     (2006.01)
*G06N 3/04*     (2006.01)
(Continued)

(52) U.S. Cl.
CPC ............ *G06N 3/08* (2013.01); *G06K 9/6217* (2013.01); *G06K 9/6255* (2013.01); *G06K 9/66* (2013.01);
(Continued)

(58) Field of Classification Search
CPC ...... G06N 3/0454; G06N 3/084; G06N 7/005; G06N 3/02; G06K 9/6217; G06K 9/6255; G06K 9/66
See application file for complete search history.

(56) References Cited

U.S. PATENT DOCUMENTS

| | | |
|---|---|---|
| 5,465,321 A | 11/1995 | Smyth |
| 2003/0216896 A1 | 11/2003 | Betts et al. |

(Continued)

OTHER PUBLICATIONS

An, G. 1996. The Effects of Adding Noise During Backpropagation Training on a Generalization Performance. Neural Computation, vol. 8, No. 3, pp. 643-674, 1996.*

(Continued)

*Primary Examiner* — Kamran Afshar
*Assistant Examiner* — Ying Yu Chen
(74) *Attorney, Agent, or Firm* — Brooks Kushman P.C.

(57) ABSTRACT

A learning computer system may include a data processing system and a hardware processor and may estimate parameters and states of a stochastic or uncertain system. The system may receive data from a user or other source. Parameters and states of the stochastic or uncertain system are estimated using the received data, numerical perturbations, and previous parameters and states of the stochastic or uncertain system. It is determined whether the generated numerical perturbations satisfy a condition. If the numerical perturbations satisfy the condition, the numerical perturbations are injected into the estimated parameters or states, the received data, the processed data, the masked or filtered data, or the processing units.

31 Claims, 5 Drawing Sheets

(51) Int. Cl.
*G06N 7/00* (2006.01)
*G06K 9/66* (2006.01)
*G06K 9/62* (2022.01)

(52) U.S. Cl.
CPC .............. *G06N 3/04* (2013.01); *G06N 3/0454* (2013.01); *G06N 3/084* (2013.01); *G06N 7/005* (2013.01)

(56) References Cited

U.S. PATENT DOCUMENTS

| | | |
|---|---|---|
| 2004/0167669 A1 | 8/2004 | Karlsson |
| 2006/0293873 A1 | 12/2006 | Gardner et al. |
| 2007/0011119 A1* | 1/2007 | Thaler .................. G06K 9/6256 706/16 |
| 2007/0118286 A1 | 5/2007 | Wang et al. |
| 2007/0244575 A1 | 10/2007 | Wojsznis et al. |
| 2008/0247274 A1 | 10/2008 | Seltzer et al. |
| 2009/0299496 A1 | 12/2009 | Cade |
| 2011/0040487 A1 | 2/2011 | Hovorka |
| 2011/0064278 A1 | 3/2011 | Wu et al. |
| 2011/0093250 A1 | 4/2011 | Lin et al. |
| 2012/0316845 A1 | 12/2012 | Grey et al. |
| 2013/0041859 A1 | 2/2013 | Esterlilne |
| 2014/0025356 A1 | 1/2014 | Kosko et al. |
| 2015/0279031 A1 | 10/2015 | Cavusoglu |
| 2016/0005399 A1 | 1/2016 | Audhkhasi et al. |
| 2016/0034814 A1 | 2/2016 | Audhkhasi |
| 2016/0356125 A1 | 12/2016 | Bello |
| 2017/0060810 A1 | 3/2017 | Preston et al. |

OTHER PUBLICATIONS

Osoba, O. et al. 2011. Noise Benefits in the Expectation-Maximization Algorithm: NEM Theorems and Models. Proceedings of International Joint Conference on Neural Networks, San Jose, California, USA, Jul. 31-Aug. 5, 2011, pp. 3178-3183.*
Pierre Sermanet, David Eigen, Xiang Zhang, Michael Mathieu, Rob Fergus, and Yann LeCun, "OverFeat: Integrated Recognition, Localization and Detection using Convolutional Networks", Feb. 24, 2014, arXiv—Cornell University Library, https://arxiv.org/abs/1312.6229, pp. 1-16.*
Paul W. Hollis and John J. Paulos, "A Neural Network Learning Algorithm Tailored for VLSI Implementation", Sep. 1994, IEEE Transactions on Neural Netowrks, vol. 5 No. 5, pp. 784-791.*
Ben Poole, Jascha Sohl-Dicksteiny, and Surya Ganguli, "Analyzing noise in autoencoders and deep networks", Jun. 6, 2014, arXiv, pp. 1-10. (Year: 2014).*
Sainbayar Sukhbaatar and Rob Fergus, "Learning from Noisy Labels with Deep Neural Networks", Jun. 9, 2014, arXiv, pp. 1-10. (Year: 2014).*
Xiangtao Meng, Chao Liu, Zhiyong Zhang, and Dong Wang, "Noisy Training for Deep Neural Networks", Jul. 9-13, 2014, 2014 IEEE China Summit & International Conference on Signal and Information Processing (ChinaSIP), pp. 16-20. (Year: 2014).*
USPTO. 2016. Notice of Allowance, dated May 17, 2016, for U.S. Appl. No. 13/949,048, entitled "Iterative Estimation of System Parameters Using Noise-Like Perturbations".
Audhkhasi, K. et al. 2013. Noisy Hidden Markov Models for Speech Recognition. In 2013 International Joint Conference on Neural Networks, Proceedings (IJCNN—2013), 8 pages.
Audhkhasi, K. et al. 2013. Noise Benefits in Backpropagation and Deep Bidirectional Pre-Training. In 2013 International Joint Conference on Neural Networks, Proceedings (IJCNN—2013), 6 pages.
Bishop, C.M. 1995. Training with Noise is Equivalent to Tikhonov Regularization. Neural Computation, vol. 7, No. 1, pp. 108-116, 1995.
Fessler, J.A. et al. 1994. Space-Alternating Generalized Expectation-Maximization Algorithm. IEEE Transactions on Signal Processing, vol. 42, pp. 2664-2677.
Franzke, B. et al. 2011. Noise can speed convergence in Markov chains. Physical Review E 84 (2011) 041112.
Hudson, H.M et al. 1994. Accelerated Image Reconstruction using Ordered Subsets of Projection Data. IEEE Transactions on Medical Imaging, vol. 13, pp. 601-609.
Jordan, M.I. et al. 2015. Machine Learning: Trends, Perspectives, and Prospects. Science, vol. 34, No. 6245, Jul. 17, 2015, pp. 255-260.
Osoba, O.A. 2013. Noise Benefits in Expectation-Maximization Algorithms. A Dissertation Presented to the Faculty of the USC Graduate School, University of Southern California, in partial fulfillment of the requirements for the degree Doctor of Philosophy (Electrical Engineering), Aug. 2013, 256 pages.
Osoba, O. et al. 2011. Noise Benefits in the Expectation-Maximization Algorithm: NEM Theorems and Models. Proceedings of International Joint Conference on Neural Networks, San Jose, California, USA, July 31-Aug. 5, 2011, pp. 3178-3183.
Osoba, O. et al. 2013. The Noisy Expectation-Maximization Algorithm, Fluctuation and Noise Letters, vol. 12, No. 13, 1350012-1 1350012-30, Sep. 2013.
Osoba, O. et al. 2013. Noise-Enhanced Clustering and Competitive Learning Algorithms. Neural Networks, vol. 37, pp. 132-140.
Osoba, O. et al. 2013. Erratum to Noise-Enhanced Clustering and Competitive Learning Algorithms. Neural Networks, vol. 37, 1 page.
USPTO. 2016. Non-final Office Action, dated Jan. 5, 2016, for U.S. Appl. No. 13/949,048, entitled "Iterative Estimation of System Parameters Using Noise-Like Perturbations".
Graves, A. et al., "Towards End-to-End Speech Recognition with Recurrent Neural Networks," Proceedings of the 31st International Conference on Machine Learning, Beijing, China, 2014. JMLR: W&CP v. 32, pp. 1-9.
Non-Final Office Action dated May 23, 2018 for U.S. Appl. No. 14/802,760, filed Jul. 17, 2015, 38 pgs.
Non-Final Office Action dated Feb. 15, 2018 for U.S. Appl. No. 14/816,999, filed Aug. 3, 2015, 70 pgs.
Osoba, O. et al., "The Noisy Expectation-Maximization Algorithm," Fluctuation and Noise Letters, v. 12, n. 3 (2013), 30 pgs.
Osoba, O. et al., "Noise-enhanced clustering and competitive learning algorithms," Neural Networks 37 (2013), pp. 132-140.
Non-Final Office Action dated Oct. 31, 2019 for U.S. Appl. No. 14/802,760, filed Jul. 17, 2015, 14 pgs.
Final Office Action dated Dec. 12, 2018 for U.S. Appl. No. 14/802,760, filed Jul. 17, 2015, 32 pgs.
Final Office Action dated Nov. 16, 2018 for U.S. Appl. No. 14/816,999, filed Aug. 3, 2015, 68 pgs.
Non-Final Office Action dated Feb. 27, 2020 for U.S. Appl. No. 14/816,999, filed Aug. 3, 2015, 76 pgs.

* cited by examiner

NOISE-ENHANCED CONVOLUTIONAL NEURAL NETWORKS

CROSS-REFERENCE TO RELATED APPLICATION

This application is based upon and claims priority to U.S. provisional patent application 62/026,359, entitled "Noise-Boosted Convolutional Neural Networks for Image Processing," filed Jul. 18, 2014. This application is also related to U.S. patent application Ser. No. 14/802,760, entitled "Noise-Speed-Ups In Hidden Markov Models With Applications to Speech Recognition," filed Jul. 17, 2015. The entire content of each of these applications is incorporated herein by reference.

BACKGROUND

Technical Field

This disclosure relates to convolution neural networks for image and signal processing.

Description of Related Art

Convolutional Neural Networks (CNNs) are a practical way to learn and recognize images because training CNNs with backpropagation scales with training data. Backpropagation training may have only linear time complexity in the number of training samples. A CNN may convolve the input data with a set of filters. This may be roughly analogous to the use of receptive fields in the retina as in the Neocognitron network. Consider the CNN in FIG. 1 with one hidden layer for simplicity. The notation extends directly to allow "deep" or multiple hidden layers. Let X denote the input 2-dimensional data of size $M_X \times N_X$ where $M_X$ and $N_X$ are positive integers. Consider 2D filters $W_1, \ldots, W_J$ each of size $M_W \times N_W$. The convolution of X with the filter $W_j$ gives $$C_j = XW_j \qquad (1)$$

where denotes 2D convolution. The 2D data matrix $C_j$ has size $(M_X+M_W-1) \times (N_X+N_Y-1)$ with (m,n)-th entry $$C_j(m, n) = \sum_{a=1}^{M_W} \sum_{b=1}^{N_W} X(a-m, b-n) W_j(a, b). \qquad (2)$$

Pad X with zeros to define it at all points in the above double sum. Then pass the J matrices $C_1, \ldots, C_J$ element-wise through logistic sigmoid function s to give the hidden-neuron activations $Z_j$:

$$Z_j(m, n) = s(C_j(m, n)) \qquad (3)$$

$$= \frac{1}{1 + \exp(-C_j(m, n))}. \qquad (4)$$

Suppose the network has K output neurons. A $(M_X+M_W-1) \times (N_X+N_Y-1)$ weight matrix $U_j^k$ multiplies the j-th hidden neuron matrix $Z_j$ element-wise. The soft-max or Gibbs activation of the k-th output neuron is $$a_k^t = \frac{\exp\left(\sum_{j=1}^{J} e^T Z_j \odot U_j^k e\right)}{\sum_{k_1=1}^{K} \exp\left(\sum_{j=1}^{J} e^T Z_j \odot U_j^{k_1} e\right)} \qquad (5)$$

where $\odot$ denotes the element-wise Hadamard product between two matrices. e is a vector of all 1s of length $(M_X+M_W-1)(N_X+N_W-1)$. The JK matrices $U_j^k$ (j=1, ..., J and k=1, ..., K) are the weights of the connections between the hidden and output neurons. The next section presents the back-propagation training algorithm for a CNN.

Back-Propagation for CNN Training

The BP algorithm performs maximum likelihood (ML) estimation of the J convolution matrices $W_1, \ldots, W_J$ and the JK hidden-output weight matrices $U_j^k$. Let y denote the 1-in-K encoding vector of the target label for a given input image X. This means $y_k=1$ when k corresponds to the correct class and 0 otherwise. BP computes the cross entropy between the soft-max activations of the output neurons and the target vector y:

$$E(\Theta) = -\sum_{k_1=1}^{K} y_{k_1} \log(a_{k_1}^t) \qquad (6)$$

where $\Theta$ denotes all the parameters of the CNN—the J convolution matrices $W_1, \ldots, W_J$ and the weight matrix U. Minimizing this cross entropy is the same as minimizing the Kullback-Leibler divergence between the output soft-max activations and the target vector because the Kullback-Liebler divergence expands as $$KL(y \| a^t) = \sum_{k_1=1}^{K} y_{k_1} \log\left(\frac{y_{k_1}}{a_{k_1}^t}\right) \qquad (7)$$

$$= \sum_{k_1=1}^{K} y_{k_1} \log y_{k_1} - \sum_{k_1=1}^{K} y_{k_1} \log a_{k_1}^t$$

$$= -H(y) + E(\Theta)$$

where $E(\Theta)$ is the cross entropy in (7) and H(y) is the entropy of the target y. The entropy of the target does not depend on the CNN parameters $\Theta$. So minimizing the Kullback-Liebler divergence or the cross-entropy gives the same estimate $\Theta^*$ of the CNN parameters.

Note that $-E(\Theta)$ is the log-likelihood $$L(\Theta) = \log(a_k^t) = -E(\Theta) \qquad (8)$$

of the correct class label k for the given input image. So the ML estimate of $\Theta$ is $$\Theta^* = \mathrm{argmax}_\Theta L(\Theta). \qquad (9)$$

BP performs gradient ascent on the log-likelihood surface $L(\Theta)$ to iteratively find the ML estimate of $\Theta$. This also holds when minimizing squared-error because BP is equivalent to ML estimation with a conditional Gaussian distribution bishop2006pattern; audhkhasi2013noise. The estimate of $\Theta$ at the (n+1)-th iteration is $$\Theta^{(n+1)} = \Theta^{(n)} - \eta \nabla_\Lambda E(\Lambda)|_{\Theta = \Theta^{(n)}} \qquad (10)$$

where η is a positive learning rate. A forward pass in BP computes the activations of all hidden and output neurons in the CNN. Back-propagating the output neuron activation errors through the network gives the gradient of the data log-likelihood function with respect to the CNN parameters. Then gradient ascent in updates these parameters.

The hidden neuron activations in a CNN are "latent" or unseen variables for the purposes of the EM algorithm. BP here performs ML estimation of a CNN's parameters.

The EM algorithm itself is a popular iterative method for such ML estimation. The EM algorithm uses the lower-bound Q of the log-likelihood function L(Θ):

$$Q(\Theta|\Theta^{(n)}) = E_{p(Z_1, \ldots, Z_j|X, y, \Theta^{(n)})}\{\log p(Z_1, \ldots, Z_j, y|X, \Theta)\} \quad (11)$$

The J matrices $Z_1, \ldots Z_J$ are the latent variables in the algorithm's expectation (E) step. Then the Maximization (M) step maximizes the Q-function to find the next parameter estimate $$\Theta^{(n+1)} = \text{argmax}_\Theta Q(\Theta|\Theta^{(n)}). \quad (12)$$

The generalized EM (GEM) algorithm performs this optimization by stochastic gradient ascent. Theorem 1 below states that BP is a special case of the GEM algorithm. This key theorem and its proof is restated for completeness.
Theorem 1 Backpropagation is a Special Case of the GEM Algorithm The backpropagation update equation for a differentiable likelihood function p(y|x,Θ) at epoch n $$\Theta^{(n+1)} = \Theta^{(n)} + \eta \nabla_\Theta \log p(y|x, \Theta)|_{\Theta=\Theta^{(n)}} \quad (13)$$

equals the GEM update equation at epoch n $$\Theta^{(n+1)} = \Theta^{(n)} + \eta \nabla_\Theta Q(\Theta|\Theta^{(n)})|_{\Theta=\Theta^{(n)}} \quad (14)$$

where GEM uses the differentiable Q-function $Q(\Theta|\Theta^{(n)})$ in (11).

This BP-EM equivalency theorem lets the noisy EM algorithm be used to speed up the BP training of a CNN. The next section details the noisy EM algorithm. A fundamental computational problem of BP training is that it can be slow. Processing images may only exacerbate this computational burden. There have been a few ad hoc attempts to improve BP training, but no fundamental methods for speeding up BP training.

SUMMARY

A learning computer system may include a data processing system and a hardware processor and may estimate parameters and states of a stochastic or uncertain system. The system may receive data from a user or other source; process the received data through layers of processing units, thereby generating processed data; apply masks or filters to the processed data using convolutional processing; process the masked or filtered data to produce one or more intermediate and output signals; compare the output signals with reference signals to generate error signals; send and process the error signals back through the layers of processing units; generate random, chaotic, fuzzy, or other numerical perturbations of the received data, the processed data, or the output signals; estimate the parameters and states of the stochastic or uncertain system using the received data, the numerical perturbations, and previous parameters and states of the stochastic or uncertain system; determine whether the generated numerical perturbations satisfy a condition; and, if the numerical perturbations satisfy the condition, inject the numerical perturbations into the estimated parameters or states, the received data, the processed data, the masked or filtered data, or the processing units.

The learning computer system may unconditionally inject noise or chaotic or other perturbations into the estimated parameters or states, the received data, the processed data, the masked or filtered data, or the processing units.

The unconditional injection may speed up learning by the learning computer system and/or improve the accuracy of the learning computer system.

The received data may represent an image.

A learning computer system may include a data processing system and a hardware processor and may estimate parameters and states of a stochastic or uncertain system. The system may receive data from a user or other source; process only a portion of the received data through layers of processing units, thereby generating processed data; process the masked or filtered data to produce one or more intermediate and output signals; compare the output signals with reference signals to generate error signals; send and process the error signals back through the layers of processing units; generate random, chaotic, fuzzy, or other numerical perturbations of the portion of the received data, the processed data, or the output signals; estimate the parameters and states of the stochastic or uncertain system using the portion of the received data, the numerical perturbations, and previous parameters and states of the stochastic or uncertain system; determine whether the generated numerical perturbations satisfy a condition; and, if the numerical perturbations satisfy the condition, inject the numerical perturbations into the estimated parameters or states, the portion of the received data, the processed data, the masked or filtered data, or the processing units.

A non-transitory, tangible, computer-readable storage medium may contain a program of instructions that may cause a computer learning system comprising a data processing system that may include a hardware processor running the program of instructions to estimate parameters and states of a stochastic or uncertain system by performing one or more of the functions described herein for the computer learning system.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Injecting carefully chosen noise can speed convergence in the backpropagation training of a convolutional neural network (CNN). The Noisy CNN algorithm may speed up training on average because the backpropagation algorithm turns out to be a special case of the expectation-maximization (EM) algorithm and because such noise may speed up the EM algorithm on average. The CNN framework may give a practical way to learn and recognize images because backpropagation scales with training data. It may have only linear time complexity in the number of training samples. The Noisy CNN algorithm may find a separating hyperplane in the network's noise space. The hyperplane may arise from the noise-benefit condition that boosts the EM algorithm. The hyperplane may cut through a uniform-noise hypercube or Gaussian ball in the noise space depending on the type of noise used. Noise chosen from above the hyperplane may speed the training algorithm on average. Noise chosen from below may slow it. The algorithm may inject noise anywhere in the multilayered network. Adding noise to the output neurons reduced the average per-iteration training-set cross entropy by 39% on a standard MNIST image test set of handwritten digits. It also reduced the average per-iteration training-set classification error by 47%. Adding noise to the hidden layers can also reduce these performance measures. The noise benefit may be most pronounced for smaller data sets because the largest EM hill-climbing gains may tend to occur in the first few iterations. This noise effect can also assist random sampling from large data sets because it may allow a smaller random sample to give the same or better performance than a noiseless sample gives.

A noisy convolutional neural network (NCNN) algorithm for speeding up the backpropagation (BP) training of convolutional neural networks (CNNs) is now presented.

Figure 1:
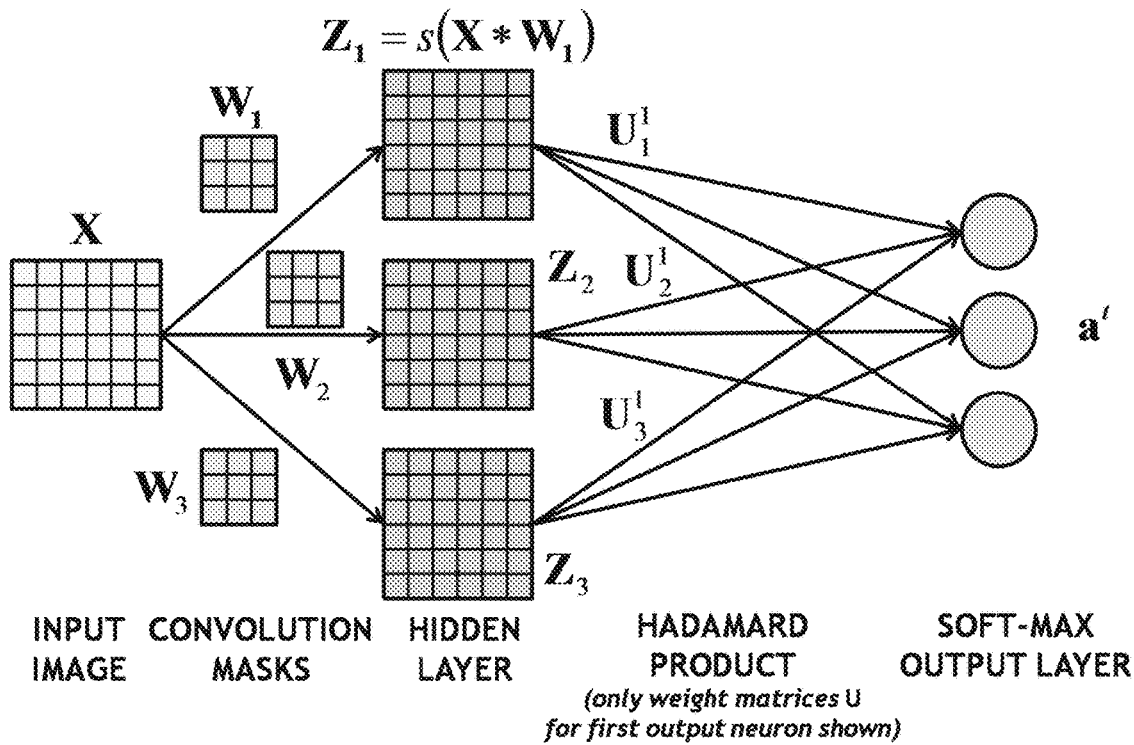
FIG. 1 illustrates an example of an architecture of a CNN with a single hidden layer.

FIG. 1 illustrates an example of an architecture of a CNN with a single hidden layer. The figure shows a CNN with just one hidden layer, although the noisy CNN algorithm applies to deep CNNs with arbitrarily many hidden layers. The input image X convolves with 3 masks $W_1$, $W_2$, and $W_3$. These masks act as receptive fields in the retina. The resulting images pass pixel-wise through logistic sigmoid functions that give the hidden neuron activations. Then, the CNN computes element-wise Hadamard products between the hidden neuron activation matrices $Z_1$, $Z_2$, and $Z_3$ with weight matrices $U_j^k$ where j=1, 2, 3 and k=1, 2, 3. The soft-max Gibbs signal function gives the activations of the output layer neurons.

The NCNN algorithm may exploit two theoretical results. The first result is that the BP algorithm may be a special case of the generalized expectation-maximization (EM) algorithm for iteratively maximizing a likelihood. This result is restated and proving below as Theorem 1. FIG. 1 shows this BP-EM correspondence at the system level. BP's forward step corresponds to the expectation or E-step. Its backward error pass corresponds to the maximization or M-step. BP's hidden parameters from its hidden layers correspond to EM's latent variables. Some "deep" neural nets can use on the order of 20 hidden layers of neurons.

BP that minimizes training-sample squared error equally maximizes a likelihood in the form of the exponential of the negative squared error. Better results were achieved with BP that minimized the more common training-set cross entropy. Minimizing this performance measure is equivalent to maximizing a likelihood. Below is shown that minimizing cross entropy here may also be equivalent to minimizing the Kullback-Liebler divergence.

The second theoretical result is that carefully chosen and injected noise may speed up the EM algorithm on average as the algorithm iteratively climbs the nearest hill of likelihood. This result is stated below as Theorem 1. Below also shows that this guaranteed EM noise-boost may give rise to a simple noise-space hyperplane condition for training CNNs with backpropagation: Noise chosen from above the hyperplane may speed CNN training on average. Noise chosen from below may slow it.

This noise-hyperplane result may explain anecdotal reports that randomly chosen noise sometimes gives a slight boost in training performance. On average, such blind noise should contain roughly the same number of noise samples from above as from below the crucial NCNN hyperplane.

The NCNN algorithm may also be useful for big data applications. There may be at least two reasons for this.

The first reason is that training with BP may scale only linearly with sample size. Training BP with n samples incurs only linear O(n) time complexity. Linear complexity holds because the forward or predictive pass of BP has only O(1) complexity. The more involved backward pass has O(n) complexity. BP's overall linear complexity contrasts with the $O(n^2)$ time complexity of modern support-vector kernel methods kung2014kernel. The quadratic complexity of such kernel methods arises from the O(n) complexity of their predictive pass. The recent Fastfood kernel algorithm reduces the $O(n^2)$ kernel complexity to O(n log d) for n nonlinear basis functions in d dimensions. Fastfood's log linear complexity appears to be the current lower bound for kernel methods.

The second reason is that noise-boosting enhances sampling from big-data data sets. A natural way to deal with ever bigger data sets is to randomly sample from them and thus throw away or ignore some or even much of the data. Sufficiently large sample sizes can give adequate statistical precision in many cases. The laws of large numbers ensure this when using sample means and variances or covariances. This opens the door to an array of Monte Carlo sampling techniques. Some big-data "sketching" algorithms already use some form of sampling.

The NCNN algorithm allows the user to take a smaller random sample than in the noiseless case for a given level of performance or take the same number of samples for a better level of performance.

Figure 2:
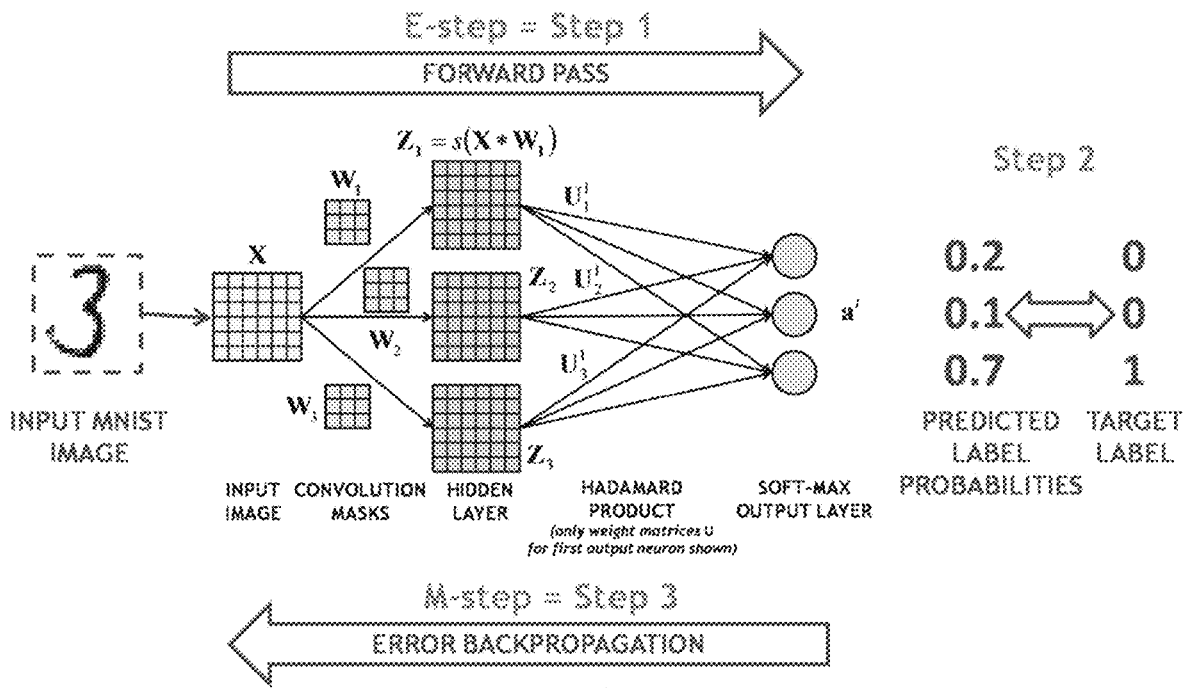
FIG. 2 illustrates an example of backpropagation CNN training as the EM algorithm.

FIG. 2 illustrates an example of backpropagation CNN training as the EM algorithm. BP's forward pass corresponds to the EM algorithm's E-step and its backward pass corresponds to the M-step. The hidden neurons and parameters correspond to EM's latent variables. The input is an image from the MNIST data set. A forward pass through the CNN computes the activations of the hidden and output neurons. The error between the output activation vector $a^t$ and the true target vector (0,0,1) propagates back through the CNN to compute the gradient of the cross entropy. Then gradient descent updates the weights of the CNN.

FIG. 2 shows that NCNN training with only 700 random image samples had on average the same squared error that noiseless BP training of a CNN had with 1000 such random samples. This 300-sample noise benefit decreased to 100 samples as the noiseless training approached 2000 random image samples.

The NCNN algorithm was tested on standard MNIST test images for image recognition. The test images were handwritten digits from zero to nine. A substantial reduction in training time was found when compared with ordinary or noiseless backpropagation: NCNN reduced the average per-iteration training-set cross entropy by 39%.

These simulations achieved this noise boost by adding noise only to the output neurons. The general algorithm presented below allows the user to add noise to any of the neurons in the multilayered network. Adding noise to hidden or throughput neurons entails only slightly increased cost in terms of using a new scaling matrix and further speeds up BP training.

Figure 3:
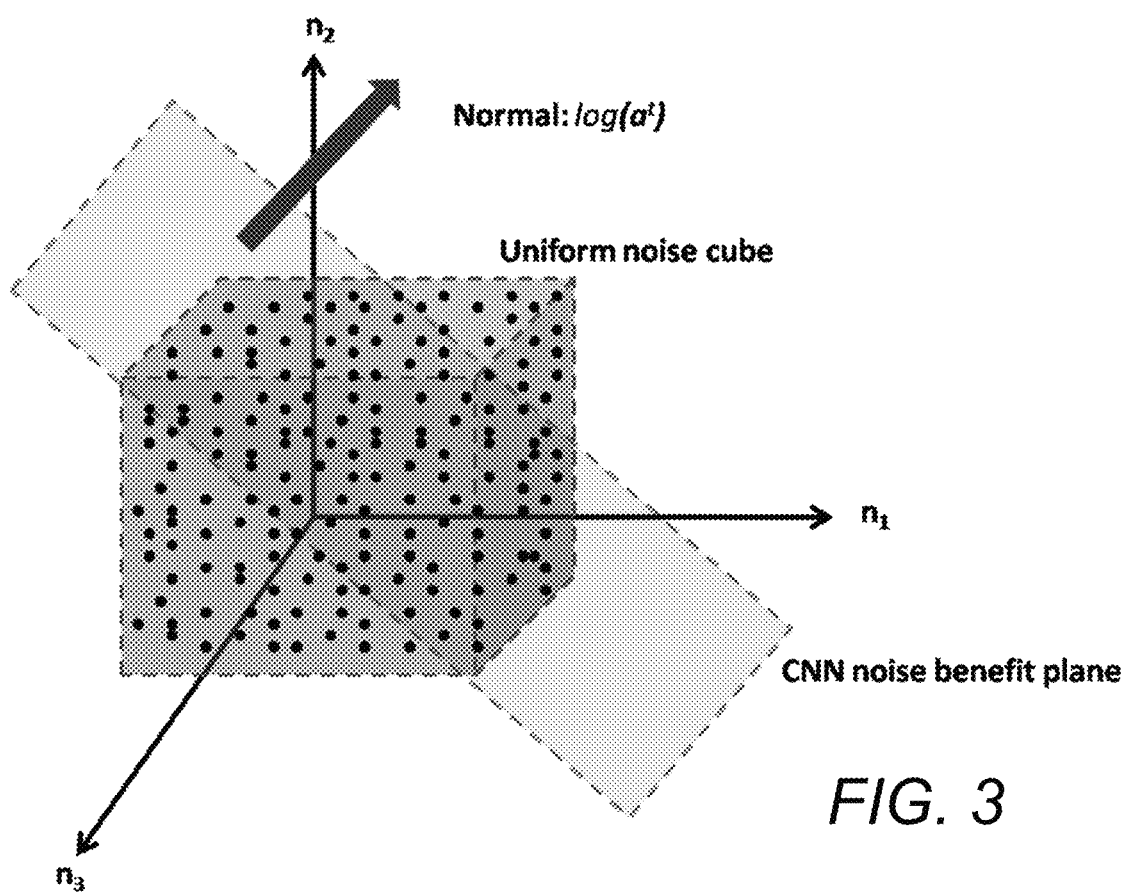
FIG. 3 illustrates a defining NCNN hyperplane that passes through the origin of a network's output-layer noise space.

FIG. 3 illustrates a noise-benefit region for a CNN with soft-max output neurons: Noise speeds up the maximum-likelihood parameter estimation of the CNN with soft-max output neurons if the noise lies above a CNN-based hyperplane that passes through the origin of the noise space. Independent and identically distributed uniform noise lies inside the noise cube. The activation signal at of the output layer controls the normal to the hyperplane. The hyperplane changes as learning proceeds because the parameters and hidden-layer neuron activations change. Adding noise from below the hyperplane slows convergence on average.

The hyperplane structure implies that the NCNN involves only a simple linear condition on the noise. The three dimensions of the noise space in this example correspond to the three output neurons in FIG. 2. Adding uniform noise to the output neurons defines the uniform noise cube. Adding Gaussian noise defines a Gaussian noise ball and so on.

Noise above the hyperplane speeds BP training convergence on average because it is just the noise that increases the iterative likelihood steps in the corresponding EM algorithm. Noise below the hyperplane slows BP convergence on average because it decreases the EM's likelihood steps compared with the noiseless case. The noise benefit will gradually shrink as the sample size increases. This means in effect that the noise boxes or balls will shrink as the noise boost becomes fainter.

Figure 4:
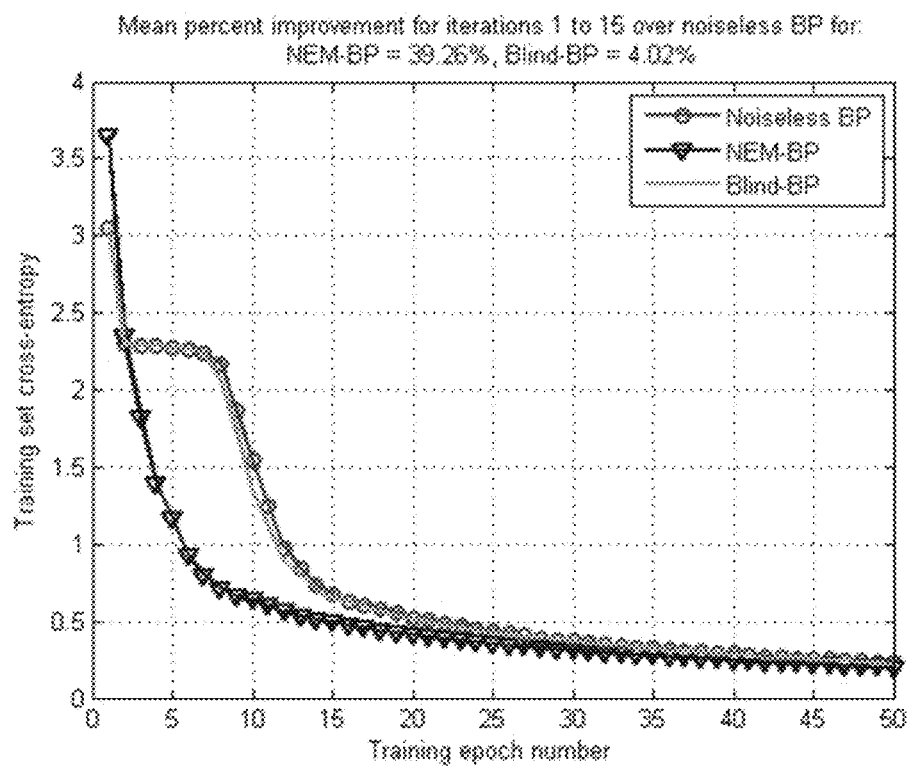
FIG. 4 shows training-set cross entropy of a CNN using standard noiseless BP, BP with blind noise (Blind-BP), and BP with noisy-EM noise (NEM-BP).

FIG. 4 shows the training-set cross entropy of a CNN using standard noiseless BP, BP with blind noise (Blind-BP), and BP with noisy-EM noise (NEM-BP). Blind-BP ignores the NEM sufficient condition and adds all noise samples to the training data. NCNN or Noisy BP reduced the average training-set cross entropy by 39.26% compared with noiseless back-propagation.

Figure 5:
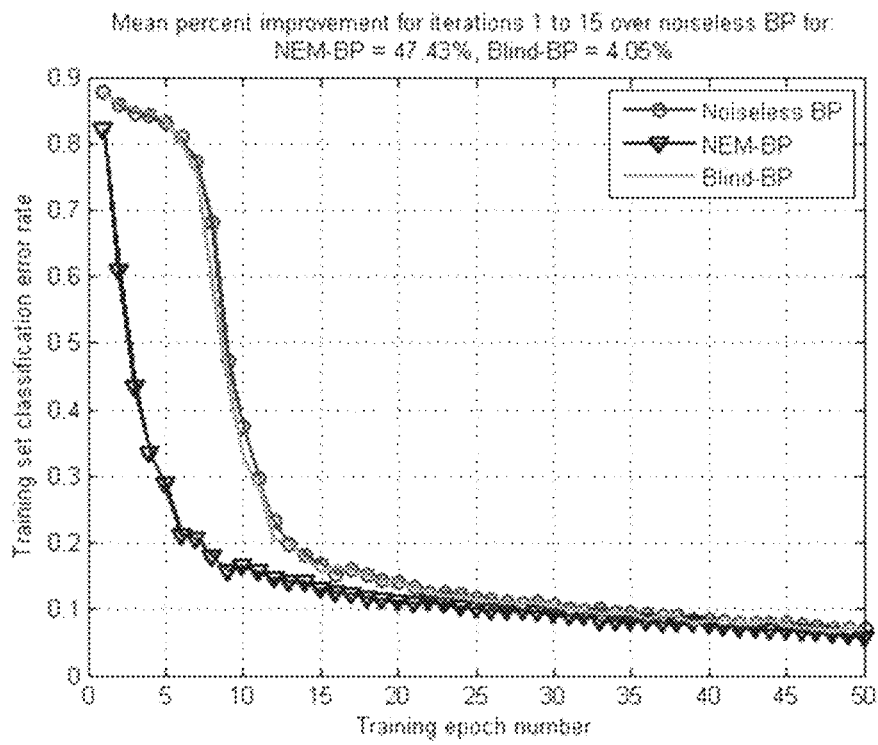
FIG. 5 plots training-set classification error rates as a system trained.

FIG. 5 plots the training-set classification error rates as the system trained. The testing-set classification error rate was nearly the same at convergence. NEM-BP gave a 47.43% reduction in training-set error rate averaged over the first 15 iterations compared with noiseless BP. Adding blind noise only slightly improved cross entropy and classification accuracy.

Figure 6:
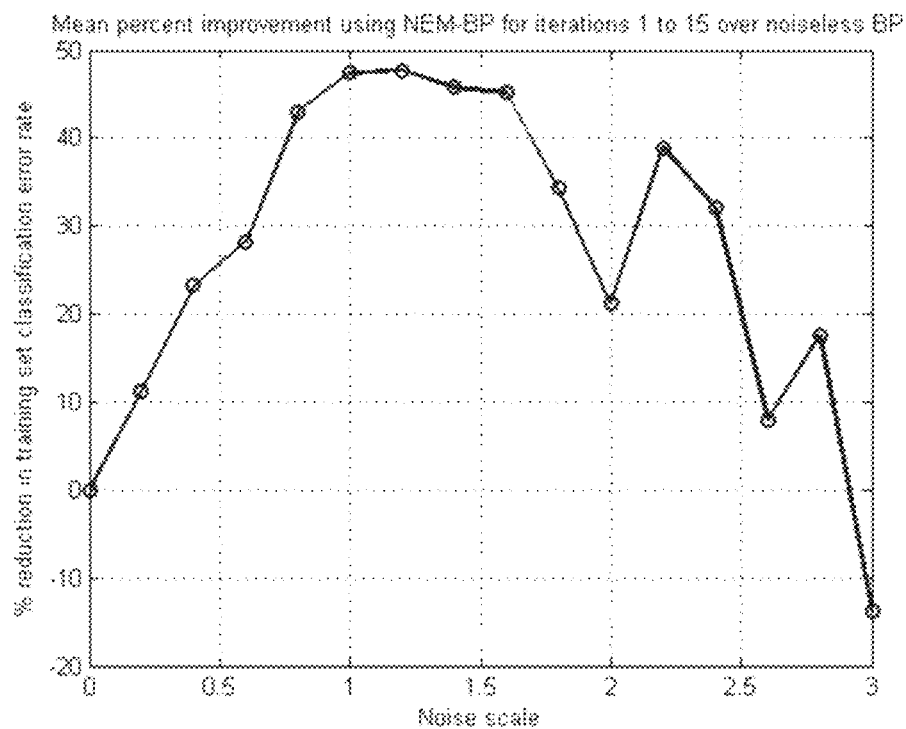
FIG. 6 shows a noise-benefit inverted U-curve for NCNN training of a CNN on the MNIST data set.

FIG. 6 shows a noise-benefit inverted U-curve for NCNN training of a CNN on the MNIST data set. This inverted U-curve is the signature of a classic nonlinear noise benefit or so-called stochastic resonance. The optimal uniform noise scale occurred at 1. NEM noise hurt or slowed CNN training when the noise scale increased beyond 2.6.

Noisy Expectation-Maximization (NEM) Algorithm

The Noisy Expectation-Maximization (NEM) algorithm ("The Noisy Expectation-Maximization Algorithm," Osonde Osoba, Sanya Mitaim, and Bart Kosko, *Fluctuation and Noise Letters*, vol. 12, no. 3, 1350012-1-1350012-30, September 2013) provably speeds up the EM algorithm on average. It adds noise to the data at each EM iteration. The noise decays with the iteration count to ensure convergence to the optimal parameters of the original data model. The additive noise must also satisfy the NEM condition below that ensures that the NEM parameter estimates will climb faster up the likelihood surface on average.

NEM Theorem

The NEM Theorem states when noise speeds up the EM algorithm's convergence to a local optimum of the likelihood surface. The NEM Theorem uses the following notation. The noise random variable N has probability density function (pdf) p(n|x). So the noise N can depend on the data x. Vector h denotes the latent or hidden variables in the model. $\{\Theta^{(n)}\}$ is a sequence of EM estimates for $\Theta$.

$$\Theta_* = \lim_{n \to \infty} \Theta^{(n)}$$

is the converged EM estimate for $\Theta$. Define the noisy Q function as the expectation $Q_N(\theta|\theta)^{(n)} = E_{h,x,\Theta_k}[\ln p(x+N, h|\theta)]$. Assume that the differential entropy of all random variables is finite and that the additive noise keeps the data in the support of the likelihood function. Then, the general NEM theorem may be stated as ("The Noisy Expectation-Maximization Algorithm," with Osonde Osoba, Sanya Mitaim, and Bart Kosko, Fluctuation and Noise Letters, vol. 12, no. 3, 1350012-1-1350012-30, September, 2013) Theorem 2 Noisy Expectation Maximization (NEM)

The EM estimation noise benefit $$Q(\Theta_*|\Theta_*) - Q(\Theta^{(n)}|\Theta_*) \geq Q(\Theta_*|\Theta_*) - Q_N(\Theta^{(n)}|\Theta_*) \quad (15)$$

or equivalently $$Q_N(\Theta^{(n)}|\Theta_*) \geq Q(\Theta^{(n)}|\Theta_*) \quad (16)$$

holds on average if an average positivity condition holds.

Reversing the inequalities in the NEM Theorem gives a dual theorem for noise harm on average. Injecting noise from below the hyperplane in FIG. 3 slows convergence on average. This result is stated as Corollary 1.

Corollary 1 Noise Harm in Expectation Maximization

The EM estimation noise harm $$Q(\Theta_*|\Theta_*) - Q(\Theta^{(n)}|\Theta_*) \leq Q(\Theta_*|\Theta_*) - Q_N(\Theta^{(n)}|\Theta_*) \quad (17)$$

or equivalently $$Q_N(\Theta^{(n)}|\Theta_*) \leq Q(\Theta^{(n)}|\Theta_*) \quad (18)$$

holds on average if the nonnegative expectation (of the logarithm of a ratio of conditional probability) holds in the NEM Theorem.

The NEM Theorem states that each iteration of a properly noisy EM algorithm gives higher likelihood estimates on average than do the regular or noiseless EM estimates. So the NEM algorithm converges faster than EM for a given data model. The faster NEM convergence occurs both because the likelihood function has an upper bound and because the NEM algorithm takes larger average steps up the likelihood surface. NEM also speeds up the training of hidden Markov models and the K-means clustering algorithm used in big-data processing. The NEM positivity condition has a much simpler form in the practical case of a Gaussian or Cauchy mixture model because then the condition reduces to a quadratic inequality.

Noisy Backpropagation for CNN Training

The next theorem states the noise-benefit sufficient condition for Gibbs-activation output neurons used in CNN K-class classification. Such beneficial noise is added only to the 1-in-K encoding vector y of the target class labels. The end of this section shows how to add NEM noise to the hidden neurons as well. Theorem 3 Forbidden Hyperplane Noise-Benefit Condition for CNN The NEM positivity condition holds for ML training of a CNN with Gibbs activation output neurons if $$E_{Y,Z_1,\ldots,Z_j,n|X,\Theta^*}\{n^T \log(a^t)\} \geq 0 \quad (19)$$

where the activation of the k-th output neuron is $$a_k^t = \frac{\exp\left(\sum_{j=1}^{J} e^T Z_j \odot U_j^k e\right)}{\sum_{k_1=1}^{K} \exp\left(\sum_{j=1}^{J} e^T Z_j \odot U_j^{k_1} e\right)} \quad (20)$$

where $\odot$ denotes the element-wise Hadamard product between two matrices. e is a vector of all 1s of length $(M_X+M_W-1)(N_X+N_W-1)$.

FIG. 3 illustrates the sufficient condition in (19) for a CNN with three output neurons. All noise n above the hyperplane $\{n:n^T \log(a^t)=0\}$ speeds CNN training on average.

A similar noise benefit result also holds for noise injection into the hidden neurons in a CNN. The hidden neuron activations become visible data during the forward pass of neural network training and behave as output neurons for earlier layers. Then the noise benefit condition becomes $(U^T n)^T \log(a^t) \geq 0$ where U is the synaptic weight matrix that connects the hidden and output layer and where $a^t$ is the vector of hidden-layer activations. This permits adding NEM noise to the hidden neurons.

Corollary 2 states a dual noise-harm result akin to Corollary. It follows from reversing the inequalities in Theorem 3 and its proof.

Corollary 2

The NEM negativity condition holds for ML training of a CNN with Gibbs activation output neurons if $$E_{y,Z_1,\ldots,Z_j,n|X,\Theta^*}\{n^T \log(a^t)\} \geq 0 \quad (21)$$

where the activation of the k-th output neuron is given in (20).

Simulation Results

Figure 7:
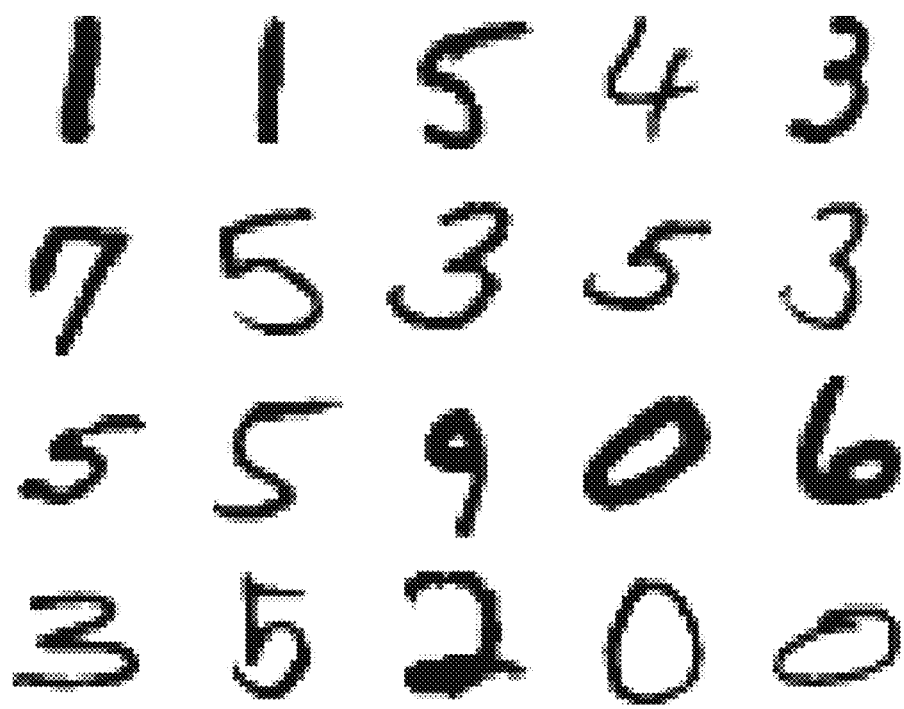
FIG. 7 illustrates samples of hand-drawn digit images.

All simulations used the MNIST data set of handwritten digits. The MNIST data set contains 28×28 gray-scale pixel images with pixel intensities between 0 and 1. FIG. 7 shows 20 sample images from this data set. FIG. 1 shows a schematic diagram of the BP training of a CNN using images from the MNIST data set.

The simulations used at least 1000 images from the MNIST training set. An open-source Matlab toolbox was modified to add noise during CNN training. The CNN contained one convolution layer with three 3×3 pixel masks each. The convolution layer was followed with factor-2 down-sampling to increase system robustness and to reduce the number of CNN parameters lecun1998gradient. A full non-convolution connection matrix U connected the neurons of the hidden layer to the output layer.

The output-layer neurons used the soft-max or Gibbs activation function for 10-way classification. All hidden neurons used the logistic sigmoid function. Uniform noise was used over $(-0.5\sqrt{c/t^d}, 0.5\sqrt{c/t^d})$ where c=0, 0.2, . . . , 3, d=1, 2, . . . , 5, and t was the training epoch. So the noise variance decreased to 0 as training epochs proceed.

FIG. 4 shows the training-set cross entropy of a CNN for three algorithms: standard noiseless BP, BP with blind noise (Blind-BP), and BP with NEM noise (NEM-BP). NEM-BP achieved a 39.26% average reduction in training-set cross entropy over the first 15 iterations compared with noiseless BP.

FIG. 5 plots the training-set classification error rates as the CNN learns. NEM-BP gave a 47.43% reduction in training-set error rate averaged over the first 15 iterations compared with noiseless BP. This significant reduction in cross-entropy and training-set error results because NEM-BP takes bigger steps on average towards the maximum likelihood CNN parameters. Adding blind noise (Blind-BP) gave only a comparatively minor improvement of 4.05%.

The relative average reduction in cross entropy for NEM-BP was next plotted as the noise scale c varied from 0 to 3 in steps of 0.2. FIG. 6 shows the resulting characteristic noise-benefit inverted U-curve. The optimal uniform noise scale occurred at c*=1 and NEM-BP gives a 39.26% improvement in average cross entropy. NEM noise hurt CNN training when the noise scale increased beyond 2.6. A very large noise variance hurt convergence because EM is a fixed-point algorithm and so too much noise tends to shadow or swamp the clean data. The noise benefit decreased to zero as the noise variance decreased because then the NEM algorithm becomes the standard EM algorithm.

How the training-data set size affects NEM performance was also explored. The MNIST training-set size was varied over 1000, 2000, . . . , 5000 and computed the relative average reduction in training cross entropy for NEM-BP using the optimal noise variance. T FIG. 7 illustrates sample hand-drawn digits used in training.

Figure 8:
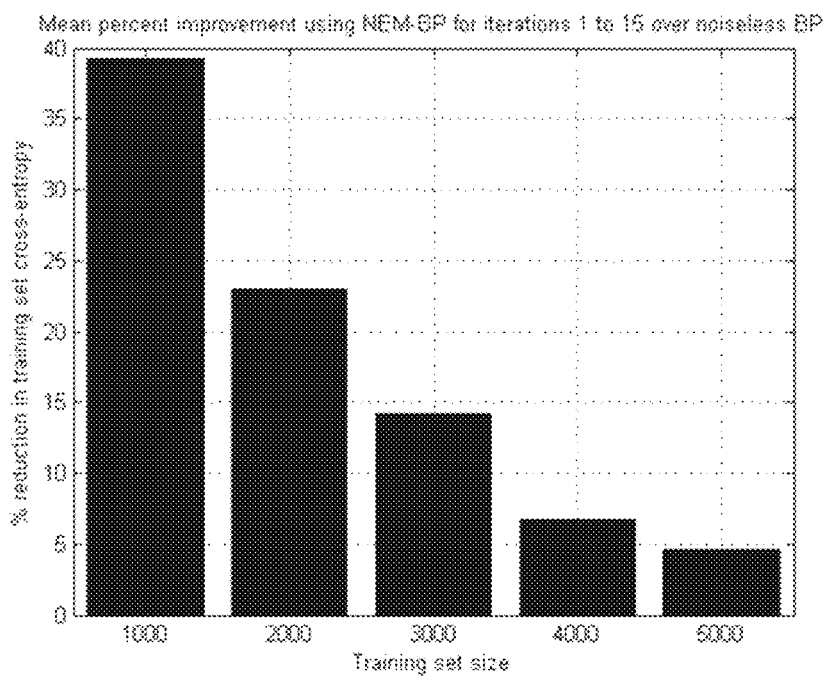
FIG. 8 illustrates a resulting decreasing bar chart: NEM-BP's performance fell as the number of training data samples increased.

FIG. 8 illustrates a resulting decreasing bar chart: NEM-BP's performance fell as the number of training data samples increased. This shows that NEM-BP is especially useful when the number of training data samples is small relative to the number of estimated CNN parameters.

FIG. 4 shows NEM noise-benefit in BP training of a CNN using MNIST data: NEM-BP training reduced the average training-set cross entropy of the MNIST data set compared with standard noiseless BP training. The NEM-BP algorithm achieved a 39.26% average reduction in cross entropy compared with standard BP over the first 15 training iterations. Adding blind noise gave only a minor average reduction of 4.02% in cross entropy. Training used 1000 images from the MNIST data for a CNN with one convolution hidden layer. The convolutional layer used three 3×3 masks or filters. Factor-2 downsampling followed the convolutional layer by removing all even index rows and columns of the hidden neuron images. The hidden layer fully connected to 10 output neurons that predicted the class label of the input digit. Uniform noise was used over $[-0.5/\sqrt{t^5}, 0.5/\sqrt{t^5}]$ where t was the training iteration number for both NEM noise and blind noise.

FIG. 5: NEM noise benefit in BP training of a CNN using MNIST data: NEM-BP training reduced the training-set classification error rate of the MNIST data set compared with standard noiseless BP training. NEM-BP achieved a 47.43% average reduction in classification error rate for the NEM-BP case compared with the standard BP over the first 15 training iterations. Adding blind noise gave only a minor average reduction of 4.05% in classification error rate. Training used 1000 images from the MNIST data for a CNN with one convolution hidden layer. The convolutional layer used three 3×3 masks or filters. Factor-2 downsampling followed the convolutional layer by removing all even index rows and columns of the hidden neuron images. The hidden layer fully connected to 10 output neurons that predicted the class label of the input digit. Uniform noise was used over $[-0.5/\sqrt{t^5}, 0.5/\sqrt{t^5}]$ where t was the training iteration number for both NEM noise and blind noise FIG. 6: NEM noise-benefit inverted U-curve for NEM-BP training of a CNN: The figure shows the mean percent reduction in per-iteration training-set cross entropy for NEM-BP training of a CNN with different uniform noise variances. The invered-U is the signature of a stochastic-resonance noise benefit. Zero mean uniform $(-0.5\sqrt{c/t^d}, 0.5\sqrt{c/t^d})$ noise was added where c=0, 0.2, ..., 2.8, 3, t was the training epoch, and d=5 was the noise annealing factor. The noise benefit increased when c increased from 0 to 1 and tended to decrease for values greater than 1. The optimal noise scale was c*=1. Injecting NEM noise hurt the training-set cross entropy when c≥2.6.

FIG. 8: Variation of NEM-BP performance benefit with increasing training-set size: The bar chart shows the relative average reduction in training-set cross entropy for NEM-BP as the training-set size increased. The noise benefit was largest for smaller training-data set sizes.

Figure 9:
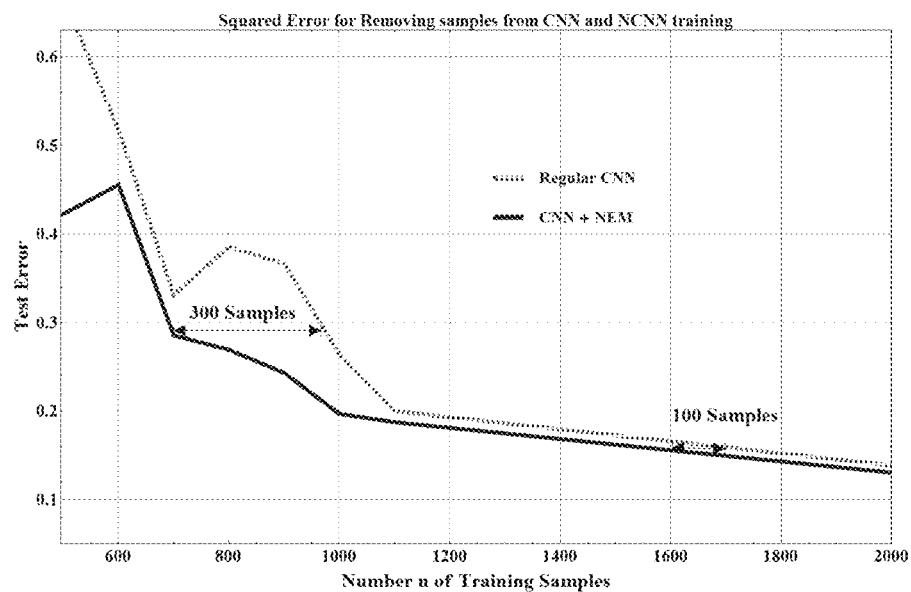
FIG. 9 summarizes the results of BP training of CNN with 1,000 randomly sampled test images corresponds in squared error to NCNN training with only 700 samples.

How the NCNN algorithm favors subset sampling with CNN image recognition was also simulated. FIG. 9 summarizes the results: BP training of CNN with 1,000 randomly sampled test images corresponds in squared error to NCNN training with only 700 samples. So the noise benefit was roughly 300 samples. This benefit fell to 100 samples as the noiseless samples approached 2,000.

The simulations first trained the CNN on a random selection of 1000 MNIST sample images from the full 60000 sample training set. 20 separate training runs were run at the same sample size and recorded the final squared error on the test set for each run. The next step repeated the same simulation setup but with 5% fewer samples for training. The experiment was repeated reducing the training set by 5% on each simulation epoch.

FIG. 9 illustrates random-sampling noise boost: The two curves show the relative effects of training-set sample size on CNN and NCNN for the NMIST images. Noise training improved the performance of the CNN at given training sample sizes. NCNN training with only 700 random image samples had on average the same squared error that noise-less BP training of a CNN had with 1000 random image samples. This 300-sample noise benefit decreased to 100 samples as the noiseless training approached 2000 random image samples. The dashed line shows the average test-set squared error for the CNN at different training set sizes. The solid line shows the average test-set squared error for the NCNN at different training set sizes. Each plotted error value averaged 20 error measurements.

The simulation ended with the 500-sample training-set case. The dashed curve in FIG. 9 shows the average test-set squared error at each training sample size. Each point averaged 20 test-set squared error values. The solid curve in FIG. 9 arose from a similar experiment that used NEM noise in the CNN training procedure and thus that ran the NCNN algorithm.

SUMMARY

Careful noise injection speeds up the backpropagation training of a convolutional neural network (CNN). This result follows because the BP algorithm is a special case of the generalized EM algorithm and because the recent noisy EM theorem gives a sufficient condition for noise to speed up the average convergence of the EM algorithm. The Noisy CNN (NCNN) algorithm uses this noisy-EM result to produce a hyperplane in noise space that separates helpful noise from harmful noise. NCNN noise-injection experiments on the MNIST image data set show substantial reduction in training-set cross entropy and in classification error rate as compared with the noiseless BP algorithm. Blind noise gave at best a small noise benefit. Simulations show that the NEM noise benefit was largest for smaller data sets. This suggests exploiting these noise benefits in random sampling from large data sets. Noise injection in different combinations of hidden layers in deep networks may also be utilized.

Figure 10:
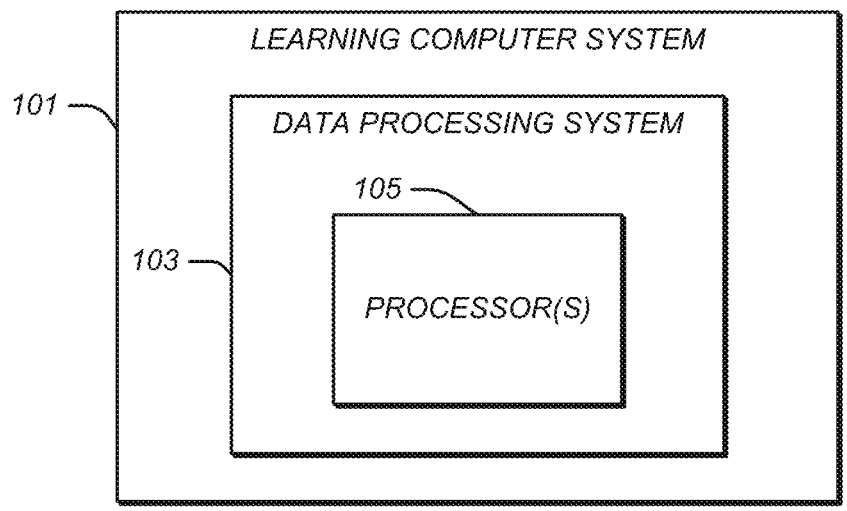
FIG. 10 illustrates an example of a learning computer system that estimates unknown parameters and states of a stochastic or uncertain system.

FIG. 10 illustrates an example of a learning computer system 101 that estimates unknown parameters and states of a stochastic or uncertain system. The learning computer system is configured to implement the various algorithms that have been discussed herein. The learning computer system may include a data processing system 103, which may include one or more hardware processors 105. The learning computer system may also include one or more tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The learning computer system may include one or more computers at the same or different locations. When at different locations, the computers may be configured to communicate with one another through a wired and/or wireless network communication system.

The learning computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the injected perturbations can be based on noise, or chaos, or fuzz, or uncertain random variables. The injection itself need not be additive. It can also be multiplicative or have any functional form. The perturbations that boost the random sampling of training samples can exploit bootstrapping and general forms of Monte Carlo sampling.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A learning computer system that estimates parameters and states of a stochastic or uncertain system comprising a data processing system that includes a hardware processor that has a configuration that:

receives data from a user or other source;

processes the received data through layers of processing units, thereby generating processed data;

applies masks or filters to the processed data using convolutional processing;

processes the masked or filtered data to produce one or more intermediate and output signals;

compares the output signals with reference signals to generate error signals;

sends and processes the error signals back through the layers of processing units;

generates random, chaotic, fuzzy, or other numerical perturbations of the received data, the processed data, or the output signals;

estimates the parameters and states of the stochastic or uncertain system using the received data, the numerical perturbations, and previous parameters and states of the stochastic or uncertain system;

determines whether the generated numerical perturbations satisfy a Noisy Expectation-Maximization condition;

and if the numerical perturbations satisfy the Noisy Expectation-Maximization condition, injects the numerical perturbations into the estimated parameters or states, the received data, the processed data, the masked or filtered data, or the processing units.

2. The learning computer system of claim 1 wherein the learning computer system unconditionally injects noise or chaotic or other perturbations into the estimated parameters or states, the received data, the processed data, the masked or filtered data, or the processing units.

3. The learning computer system of claim 2 wherein the unconditional injection speeds up learning by the learning computer system.

4. The learning computer system of claim 2 wherein the unconditional injection improves the accuracy of the learning computer system.

5. The learning computer system of claim 1 wherein the received data represents an image.

6. The learning computer system of claim 1 wherein the injection speeds up learning by the learning computer system.

7. The learning computer system of claim 1 wherein the injection improves the accuracy of the learning computer system.

8. A learning computer system that estimates parameters and states of a stochastic or uncertain system comprising a data processing system that includes a hardware processor that has a configuration that:

receives data from a user or other source;
processes only a portion of the received data through layers of processing units, thereby generating processed data;
processes the masked or filtered data to produce one or more intermediate and output signals;
compares the output signals with reference signals to generate error signals;
sends and processes the error signals back through the layers of processing units;
generates random, chaotic, fuzzy, or other numerical perturbations of the portion of the received data, the processed data, or the output signals;
receives data from a user or other source;
processes only a portion of the received data through layers of processing units, thereby generating processed data;
processes the masked or filtered data to produce one or more intermediate and output signals;
compares the output signals with reference signals to generate error signals;
sends and processes the error signals back through the layers of processing units;
generates random, chaotic, fuzzy, or other numerical perturbations of the portion of the received data, the processed data, or the output signals;
estimates the parameters and states of the stochastic or uncertain system using the portion of the received data, the numerical perturbations, and previous parameters and states of the stochastic or uncertain system;
determines whether the generated numerical perturbations satisfy a Noisy Expectation-Maximization condition;
determines whether the generated numerical perturbations satisfy a Noisy Expectation-Maximization condition;
and if the numerical perturbations satisfy the Noisy Expectation-Maximization condition, injects the numerical perturbations into the estimated parameters or states, the portion of the received data, the processed data, the masked or filtered data, or the processing units.

9. The learning computer system of claim 8 wherein the system applies masks or filters to the processed data using convolutional processing.

10. The learning computer system of claim 8 wherein the injection speeds up learning by the learning computer system.

11. The learning computer system of claim 8 wherein the injection improves the accuracy of the learning computer system.

12. The learning computer system of claim 8 wherein the system injects the random, chaotic, fuzzy, or other numerical perturbations into the portion of the received data.

13. The learning computer system of claim 8 wherein the learning computer system unconditionally injects noise or chaotic or other perturbations into the estimated parameters or states, the portion of the received data, the processed data, the masked or filtered data, or the processing units.

14. The learning computer system of claim 13 wherein the unconditional injection speeds up learning by the learning computer system.

15. The learning computer system of claim 13 wherein the unconditional injection improves the accuracy of the learning computer system.

16. A non-transitory, tangible, computer-readable storage medium containing a program of instructions that causes a computer learning system comprising a data processing system that includes a hardware processor running the program of instructions to estimate parameters and states of a stochastic or uncertain system by:
receiving data from a user or other source;
processing the received data through layers of processing units, thereby generating processed data;
applying masks or filters to the processed data using convolutional processing;
processing the masked or filtered data to produce one or more intermediate and output signals;
comparing the output signals with reference signals to generate error signals;
sending and processing the error signals back through the layers of processing units;
generating random, chaotic, fuzzy, or other numerical perturbations of the received data, the processed data, or the output signals;
estimating the parameters and states of the stochastic or uncertain system using the received data, the numerical perturbations, and previous parameters and states of the stochastic or uncertain system;
determining whether the generated numerical perturbations satisfy a Noisy Expectation-Maximization condition;
if the numerical perturbations satisfy the Noisy Expectation-Maximization condition, injecting the numerical perturbations into the estimated parameters or states, the received data, the processed data, the masked or filtered data, or the processing units.

17. The storage medium of claim 16 wherein the program of instructions causes the computer learning system to unconditionally inject noise or chaotic or other perturbations into the estimated parameters or states, the received data, the processed data, the masked or filtered data, or the processing units.

18. The storage medium of claim 17 wherein the unconditional injection speeds up learning by the learning computer system.

19. The storage medium of claim 17 wherein the unconditional injection improves the accuracy of the learning computer system.

20. The storage medium of claim 16 wherein the received data represents an image.

21. The storage medium of claim 16 wherein the injection speeds up learning by the learning computer system.

22. The storage medium of claim 16 wherein the injection improves the accuracy of the learning computer system.

23. A non-transitory, tangible, computer-readable storage medium containing a program of instructions that causes a computer learning system comprising a data processing system that includes a hardware processor running the program of instructions to estimate parameters and states of a stochastic or uncertain system by:
receiving data from a user or other source;
processing only a portion of the received data through layers of processing units, thereby generating processed data;
processing the masked or filtered data to produce one or more intermediate and output signals;
comparing the output signals with reference signals to generate error signals;
sending and processing the error signals back through the layers of processing units;
generating random, chaotic, fuzzy, or other numerical perturbations of the portion of the received data, the processed data, or the output signals;
estimating the parameters and states of the stochastic or uncertain system using the portion of the received data, the numerical perturbations, and previous parameters and states of the stochastic or uncertain system; and determining whether the generated numerical perturbations satisfy a Noisy Expectation-Maximization condition;

if the numerical perturbations satisfy the Noisy Expectation-Maximization condition, injecting the numerical perturbations into the estimated parameters or states, the portion of the received data, the processed data, the masked or filtered data, or the processing units.

24. The storage medium of claim 23 wherein the program of instructions causes the computer learning system to apply masks or filters to the processed data using convolutional processing.

25. The storage medium of claim 23 wherein the injection speeds up learning by the learning computer system.

26. The storage medium of claim 23 wherein the injection improves the accuracy of the learning computer system.

27. The storage medium of claim 23 wherein the program of instructions causes the computer learning system to inject the random, chaotic, fuzzy, or other numerical perturbations into the portion of the received data.

28. The storage medium of claim 23 wherein the program of instructions causes the computer learning system to unconditionally inject noise or chaotic or other perturbations into the estimated parameters or states, the portion of the received data, the processed data, the masked or filtered data, or the processing units.

29. The storage medium of claim 28 wherein the unconditional injection speeds up learning by the learning computer system.

30. The storage medium of claim 28 wherein the unconditional injection improves the accuracy of the learning computer system.

31. A learning computer system that estimates parameters and states of a stochastic or uncertain system comprising a data processing system that includes a hardware processor that has a configuration that:

receives data from a user or other source;

processes the received data through layers of processing units, thereby generating processed data;

applies masks or filters to the processed data using convolutional processing;

processes the masked or filtered data to produce one or more intermediate and output signals;

compares the output signals with reference signals to generate error signals;

sends and processes the error signals back through the layers of processing units;

generates random, chaotic, fuzzy, or other numerical perturbations of the received data, the processed data, or the output signals;

estimates the parameters and states of the stochastic or uncertain system using the received data, the numerical perturbations, and previous parameters and states of the stochastic or uncertain system;

determines whether the generated numerical perturbations satisfy a Noisy Expectation- Maximization condition; and if the numerical perturbations satisfy the Noisy Expectation-Maximization condition, injects the numerical perturbations into the estimated parameters or states, the received data, the processed data, the masked or filtered data, or the processing units;

wherein the learning computer system injects noise or chaotic or other perturbations into the estimated parameters or states for an output neuron layer.

* * * * *

UNITED STATES PATENT AND TRADEMARK OFFICE
CERTIFICATE OF CORRECTION

PATENT NO. : 11,256,982 B2
APPLICATION NO. : 14/803797
DATED : February 22, 2022
INVENTOR(S) : Kartik Audhkhasi et al.

It is certified that error appears in the above-identified patent and that said Letters Patent is hereby corrected as shown below:

In the Claims

Column 15. Lines 31-32, Claim 8:
After "determines whether the generated numerical perturbations satisfy a Noisy Expectation-Maximization condition;"

Delete "determines whether the generated numerical perturbations satisfy a Noisy Expectation-Maximization condition;" (second occurrence)

Signed and Sealed this
Thirtieth Day of August, 2022

Katherine Kelly Vidal
*Director of the United States Patent and Trademark Office*